(12) United States Patent
Arora (10) Patent No.: US 7,187,415 B2
(45) Date of Patent: Mar. 6, 2007

(54) SYSTEM FOR DETECTING ASPECT RATIO AND METHOD THEREOF

(75) Inventor: Jitesh Arora, Thornhill (CA)

(73) Assignee: ATI Technologies, Inc., Markham (CA)

( * ) Notice: Subject to any disclaimer, the term of this patent is extended or adjusted under 35 U.S.C. 154(b) by 714 days.

(21) Appl. No.: 10/317,297

(22) Filed: Dec. 12, 2002

(65) Prior Publication Data

US 2004/0114049 A1  Jun. 17, 2004

(51) Int. Cl.
*H04N 7/01* (2006.01)
(52) U.S. Cl. ........................ 348/445; 348/556
(58) Field of Classification Search ................ 348/441, 348/443, 445, 452, 458, 459, 913, 554, 555, 348/556, 558; *H04N 7/01, 11/20, 5/46, 3/27*
See application file for complete search history.

(56) References Cited

U.S. PATENT DOCUMENTS 6,366,706 B1 * 4/2002 Weitbruch .................. 348/556

6,714,254 B2 * 3/2004 Enomoto ..................... 348/564

FOREIGN PATENT DOCUMENTS

EP  755152 A2 *  1/1997

\* cited by examiner

*Primary Examiner*—Sherrie Hsia (57) ABSTRACT

Video is received at a standard aspect ratio. The video includes video content having an alternate aspect ratio. The video content is provided in a letterboxed format with black bars to make up the standard aspect ratio. The video is analyzed to identify portions of the video related to changing video content. A boundary for the changing video content is identified as the alternate aspect ratio. The alternate aspect ratio is then applied to the video to present the video at the alternate aspect ratio. Extraneous portions of the video, such as the black bars, are then discarded from the video to present the video at the alternate aspect ratio.

29 Claims, 4 Drawing Sheets

SYSTEM FOR DETECTING ASPECT RATIO AND METHOD THEREOF

FIELD OF THE DISCLOSURE

The present disclosure relates generally to video systems and more particularly to video systems with variable aspect ratios.

BACKGROUND

Consumer interest in multimedia entertainment has expanded. Computer systems can be used to enhance a multimedia experience to a consumer. Computer systems can include communications interfaces to receive and process multimedia data from a network, such as the Internet, or compact disk (CD) or digital video disk (DVD) drives to playback video to the consumer. Computer systems can include television tuner cards to receive analog multimedia data. By playing back video within a computer system, windows used to present video within an operating system can be resized to match different aspect ratios associated with the video data. Similarly, multimedia data can be stored in the computer system for future playback in the aspect ratio the video is to be displayed.

Analog multimedia data, such as associated with analog television signals, is generally presented at a standard television aspect ratio, such as 4:3. Video having a different aspect ratio than the standard television aspect ratio is presented in an alternate format to accommodate for the standard aspect ratio, such as in the letterboxed format. In letterboxed format, the original video is provided at the standard aspect ratio, having the actual video content provided in its native aspect ratio with black bars above and below the video content to make up the standard aspect ratio. Black bars can also be provided on the left and right of the video content, depending on the aspect ratio of the video content. As the analog multimedia data is provided at 4:3 with black bars, the letterboxed video is played back with the black bars even in computer systems. The black bars must be processed with the video content and, when the video content is encoded and stored in memory, the black bars are also encoded and stored.

From the above discussion, it should be apparent that an improved method of handling letterboxed video data is needed.

BRIEF DESCRIPTION OF THE DRAWINGS

Specific embodiments of the present disclosure are shown and described in the drawings presented herein. Various advantages, features and characteristics of the present disclosure, as well as methods, operations and functions of related elements of structure, and the combination of parts and economies of manufacture, will become apparent upon consideration of the following description and claims with reference to the accompanying drawings, all of which form apart of this specification, and wherein:

DETAILED DESCRIPTION OF THE FIGURES

At least one embodiment of the present disclosure includes a method for modifying an aspect ratio associated with a video stream. The method includes receiving an input video stream. The input video stream is provided at a first aspect ratio. In one embodiment, the input video stream is provided as part of an analog video stream and the first aspect ratio is a standard or full screen, television aspect ratio, such as a 4:3 aspect ratio. The method also includes determining a second aspect ratio, different from the first aspect ratio. In one embodiment, the input video stream is analyzed to identify portions of the input video stream that are moving. The portions of the input video stream that are moving are used to identify a video content aspect ratio which may be present in the first input video stream, wherein video outside of the video content aspect ratio is related to extraneous video, such as black bars, used to make up the rest of the video frame to attain the first aspect ratio. The video content aspect ratio can then be used to identify the second aspect ratio. The method further includes providing a modified video stream, based on the input video stream. The modified video stream is provided at the second aspect ratio. The present disclosure has the advantage of eliminating the extraneous video used to convert video having the second aspect ratio to video having the first aspect ratio. Another advantage of at least one embodiment of the present disclosure is that users can reduce an amount of desktop space used to provide video playback by eliminating black bars provided with the video.

Figure 1:
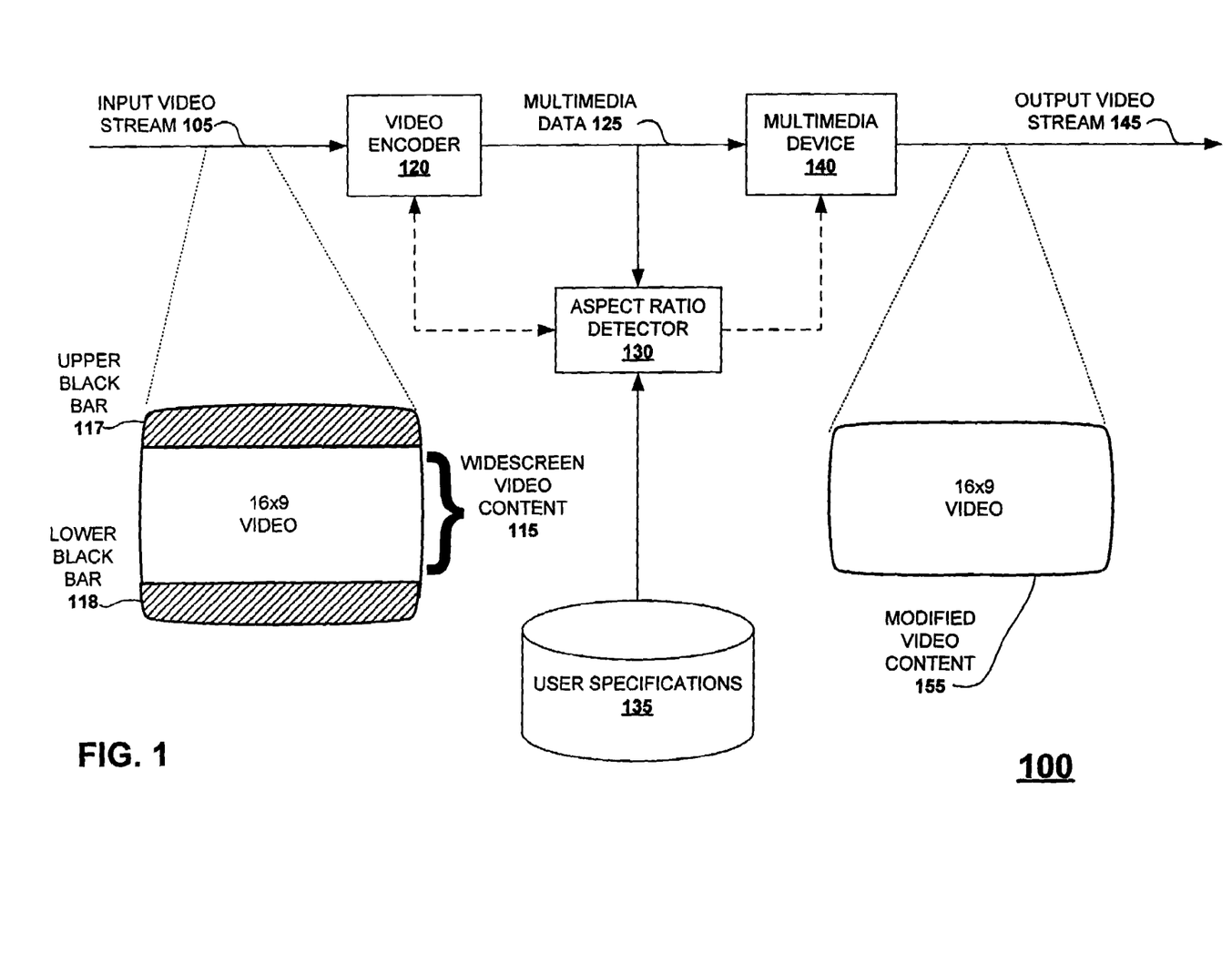
FIG. 1 is a block diagram illustrating a system for modifying an aspect ratio of a received video stream, according to one embodiment of the present disclosure.

Referring now to FIG. 1, a block diagram illustrating a system for generating a modified video stream from a received video stream is shown and referenced generally as system 100, according to one embodiment of the present disclosure. System 100 includes a video encoder 120 to receive an input video stream 105 representing a full-screen letterboxed video 110. System 100 also includes a multimedia device 140 to provide an output video stream 145, having a modified video 155, and an aspect ratio detector 130. The aspect ratio detector 130 identifies a widescreen video content 115, having an aspect ratio different from the full-screen letterboxed video 110. The aspect ratio detector 130 then applies the aspect ratio of the widescreen video content 115 to generate the modified video 155 in the multimedia device 140, based on a set of user specifications 135. In one embodiment, the multimedia device 140 uses information provided by the aspect ratio detector 130 to crop out the black bars 117 and 118 from the input video stream.

In one embodiment, the video encoder 120 is used to receive input video stream 105 and generate multimedia data 125, associated with the input video stream 105, for the multimedia device 140. The video encoder 120 represents an encoder to process the input video stream 105 into a format used by the multimedia device 140. For example, in one embodiment, the multimedia device 140 includes a Motion Pictures Experts Group (MPEG) device. Accordingly, the video encoder 120 encodes the input video stream 105 into MPEG video, output as multimedia data 125. The video encoder 120 can include a digital encoder, such as an MPEG encoder, a demodulator, a television tuner, and the like. Input video stream 105 includes video and/or audio data used to represent a multimedia stream.

Multimedia device 140 includes hardware, or software, used to present the multimedia data 125 to a user, through output video stream 145. For example, the multimedia device 140 can include an application to provide a representation of the multimedia data 125 on a display screen (not shown). Alternatively, the multimedia device 140 can include a multimedia-recording device used to store output video stream 145 for playback at a future time. Multimedia device 140 can generate output video stream 145 to represent a portion of the multimedia data 125. A portion of multimedia data 125 can be identified for storage or display. Furthermore, multimedia device 140 can generate video windows of arbitrary sizes for displaying output video stream 145 based on a selected aspect ratio. In one embodiment, aspect ratio detector 130 identifies the portion of multimedia data 125 to process, store, or display. In one embodiment, the video windows include operating system windows used for video playback.

In one embodiment, the input video stream 105 includes an analog video stream. For example, the input video stream 105 can be related to an analog video stream provided from a television tuner and/or a television demodulator, an output of a digital video disk (DVD) player, a video cassette recorder (VCR), a digital satellite receiver, or other video provider. The input video stream 105 can be intended for playback on a display with a fixed aspect ratio. For example, video associated with standard analog television broadcast is generally formatted to a fixed display ratio, such as the full-screen aspect ratio 4:3. However, to display video content not of the full-screen aspect ratio, extraneous video content is added. For example, to provide a widescreen video content 115, having a 16:9 aspect ratio, as a part of the input video stream 105, upper black bar 117 and lower black bar 118 are used. The black bars 117 and 118 take up extra frame space to provide the widescreen video content 115 at the full-screen aspect ratio.

Extraneous video content, such as black bars 117 and 118, can be disadvantageous. For example, black bars 117 and 118 can impose additional processing during video playback or storage. If the full-screen letterboxed video 110 is to be displayed, the black bars 117 and 118 reduce an amount of desktop workspace available to the user during playback. However, full-screen letterboxed video 110 is provided as a single set of video content to be displayed as input video stream 105. Accordingly, aspect ratio detector 130 can be used to determine the aspect ratio of widescreen video content 115 and set multimedia device 140 appropriately to identify and process only the portion of multimedia device 140 containing widescreen video content 115.

Aspect ratio detector 130 is used to identify differences between widescreen video content 115 and black bars 117 and 118. In one embodiment, the aspect ratio detector 130 is used to identify boundaries of moving content within full-screen letterboxed video 110. As previously discussed, video encoder 120 can include a digital video encoder, such as an MPEG decoder. Accordingly, components of video encoder 120 used for motion compensation can be used to identify which portions of full-screen letterboxed video 110 are moving. Moving portions can be associated with video content, such as widescreen video content 115 and non-moving video portions can be associated with extraneous video, such as black bars 117 and 118. Furthermore, a color associated with the non-moving portions can be compared to a color, such as black, to identify the non-moving portion as being associated with extraneous data, such as the black bars 117 and 118. The boundary of the moving portions can be compared to known aspect ratios, such as 5:4 or 16:9. For example, the aspect ratio detector 130 can compare the detected aspect ratio to a table of common aspect ratios to identify the new aspect ratio. When a match is identified, the aspect ratio detector 130 sets the multimedia device 140 to select a portion of the multimedia data 125 that corresponds to the detected aspect ratio. Accordingly, output video stream 145 can include only the widescreen video content 115 when generating the modified video content 155, without the black bars 117 and 118.

In an alternate embodiment, the aspect ratio detector 130 is capable of identifying the aspect ratio of the widescreen video content 115 based on program information, such as from an electronic program guide or from the data provided with the input video stream 105. For example, in one embodiment, program information, including the aspect ratio of widescreen video content 115 is provided during a vertical blanking interval (VBI) associated with the input video stream 105. Alternatively, the aspect ratio detector 130 can identify the aspect ratio by accessing an electronic program guide on a network, such as the Internet. In another embodiment, the input video stream 105 includes a digital broadcast video stream and the aspect ratio of the widescreen video content 115 is embedded in the input video stream 105. It should be appreciated that other methods of identifying and applying an aspect ratio associated with the widescreen video content 115 can be used without departing from the scope of the present disclosure. For example, the detected aspect ratio can also be applied to the video encoder 120 for the generation of multimedia data 125. Furthermore, while aspect ratio detector 130 is shown as a separate component, aspect ratio detector 130 may be included with the multimedia device 140 or the video encoder 120.

In one embodiment, a set of user specifications 135 is provided to identify user preferences. For example, the user specifications 135 can include a noise threshold. As the aspect ratio of the widescreen video content 115 can be based on detection of moving or non-moving portions of full-screen letterboxed video 110, an amount of noise present due to a broadcast of input video stream 105 can create false results. For example, an amount of noise present in the black bars 117 and 118 can cause the aspect ratio detector 130 to identify the black bars 117 and 118 as part of valid video content, such as widescreen video content 115. Accordingly, the user can provide a noise threshold, stored in user specifications 135, to indicate an amount of noise to be expected, due to the user's specific circumstances. Accordingly, the aspect ratio detector 130 can set motion detection components to only trigger on objects larger than the expected noise or to only trigger on greater amounts of movement. The user can also specify if captions within the black bars 117 and 118 are to be expected, such as due to closed-captioned or subtitled features.

The user can specify specific sets of aspect ratios to be expected using user specifications 135. The set of aspect ratios stored in user specifications 135 can be used by the aspect ratio detector 130 for matching with the aspect ratio detected of widescreen video content 115. Alternatively, the user can specify to allow any detected aspect ratio to be used, regardless of whether a match to a known aspect ratio is identified. The user can also specify an amount of time to pass before initiating a new aspect ratio. As the aspect ratio of video content, such as the widescreen video content 115, can change abruptly, due to short clips or commercials, an amount of time specified by the user can be used to wait before initiating a new aspect ratio. It should be noted that time-shifted playback, playing video content with a delay, can be used to reduce abrupt changes in aspect ratio due to abrupt scene changes. For example, it may become obtrusive for a user to wait until a program has been playing for some time before the aspect ratio changes. If time-shifting is used, the aspect ratio of the video content can be detected and applied prior to playback of video content having the new aspect ratio. Other user specifications can be used in addition to or in place of the specifications described herein, without departing from the scope of the present disclosure.

Figure 2:
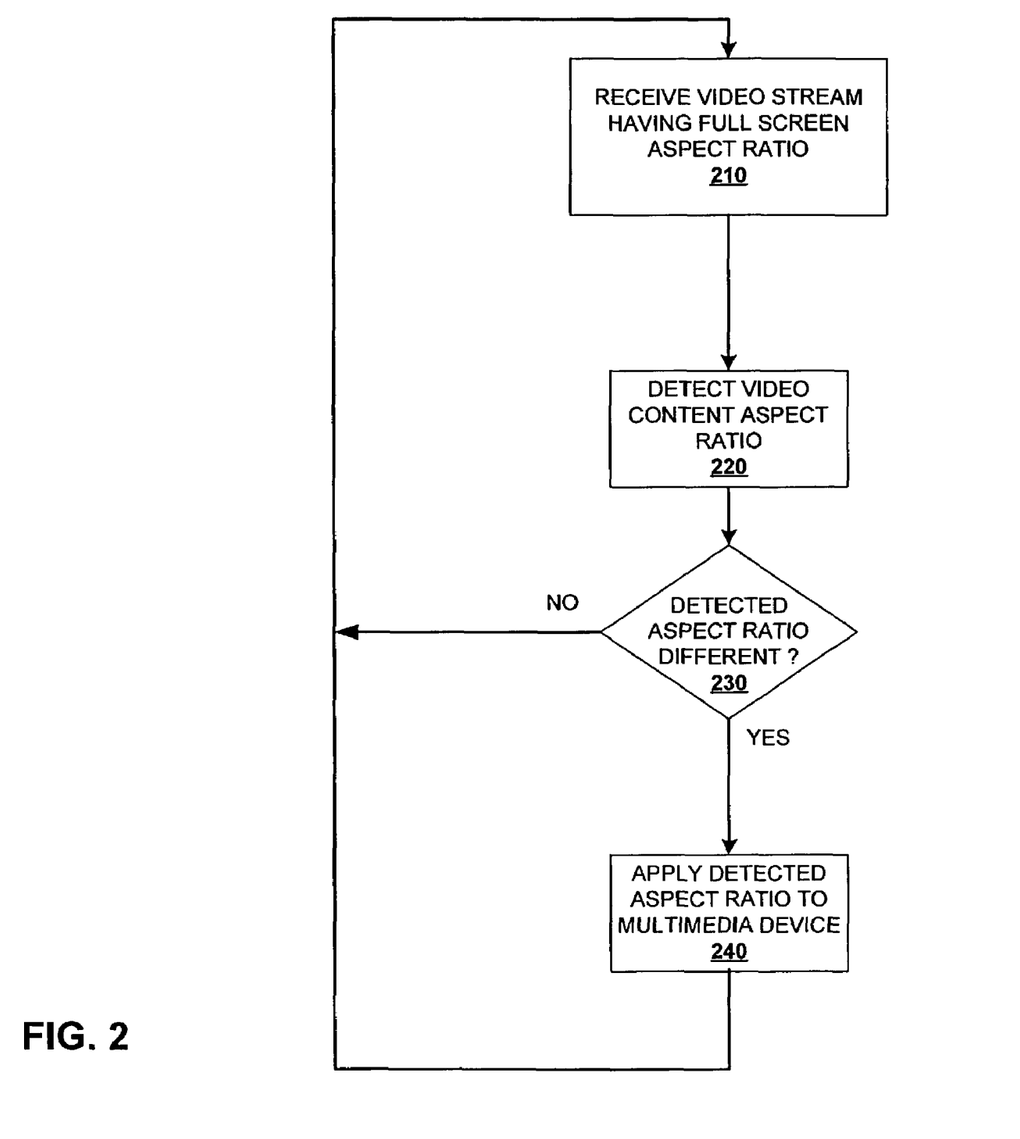
FIG. 2 is a flow diagram illustrating a method of modifying an aspect ratio of a received video stream, according to one embodiment of the present disclosure.

Referring now to FIG. 2, a flow diagram illustrating a method of modifying an aspect ratio of a received video stream is shown, according to one embodiment of the present disclosure. A video processing system receives a first video stream having a first aspect ratio. However, the received video stream includes video content having an alternate aspect ratio. Extraneous video content, such as black bars, is added to provide the video content at the first aspect ratio. The aspect ratio of the video content is identified and used to generate a new video stream. Accordingly, the new video stream can be used to provide the video content with at least a portion of the extraneous video content removed.

In step 210, the system receives the first video stream having the first aspect ratio. In one embodiment, the first video stream has a full-screen aspect ratio, such as a 4:3 aspect ratio. As previously discussed, the full-screen aspect ratio allows the first video stream to be displayed on a standard television screen. In one embodiment, the system includes an information handling system capable of presenting a representation of the first video stream in a window having an arbitrary size. The system is capable of displaying video using a variety of aspect ratios. Accordingly, the system is not limited to a restriction of full-screen aspect ratio, such as imposed on a standard television.

In step 220, the aspect ratio of the video content is detected. In one embodiment, the video content's aspect ratio is detected by monitoring motion between frames within the first video stream. For example, a boundary of moving portions of the first video stream can be used to determine the aspect ratio of the video content. In another embodiment, black portions of the screen are monitored over a set of frames to determine if black bars are present. The amount or boundaries of a moving, or non-black, screen portion can be compared to known aspect ratios. If a match exists, the matched aspect ratio is identified. Other methods of detecting aspect ratios can be used. For example, in one embodiment, an electronic program guide is accessed to identify properties of the current program. If the properties indicate the current program is being run at a particular aspect ratio, such as the 16:9 widescreen aspect ratio, the aspect ratio of the program is identified.

In step 230, it is determined if the detected aspect ratio is different from the first aspect ratio, associated with the first video stream. If the detected aspect ratio is not different from the first aspect ratio, the system returns to step 210, continuing to use the first video stream with the first aspect ratio. A representation of the first video stream with the first aspect ratio can continue to be provided to a multimedia device used to present the first video stream to a user. Alternatively, if the detected aspect ratio in step 230 is not the same as the first aspect ratio, the system proceeds to step 240. In step 240, the detected aspect ratio is applied for representing the first video stream. In one embodiment, the detected aspect ratio is provided to the multimedia device. The multimedia device can then present a second video stream to the user. The second video stream is presented at the detected aspect ratio. In one embodiment, the second video stream represents the video content in the first video stream with a significant amount of extraneous video, such as the black bars, removed.

Alternatively to modifying the first video stream to generate the second video stream, the multimedia device can present the first video stream in a video window having an aspect ratio similar to the detected aspect ratio. Extraneous video associated with the first video stream can simply be cropped out in the video window used for playback, without having to process removal of the extraneous information. In embodiments where the first video stream is to be displayed, a display driver used to render video information associated with the first video stream for display can be programmed to only render the portion of the first video stream associated with the detected aspect ratio, ignoring the portion of the first video stream associated with the extraneous information. Accordingly, the extraneous information can be removed from the first video stream without requiring a separate second video stream to be generated prior to display.

The multimedia device can include a multimedia-recording device, a video recording application or a video display application to provide a representation of the first video stream to a user on a display screen. In one embodiment, the aspect ratio of the display device used for playback of the second video stream is also taken into account. For example, if the video stream to be displayed is to be displayed full-screen and the detected aspect ratio is not the same as the aspect ratio of the display device, the aspect ratio used to display the video stream may need to be modified. Accordingly, the aspect ratio of the display device may be applied to the detected aspect ratio for full-screen display, while still reducing extraneous video present in the first video stream. Once step 240 is completed, step 210 can be performed again. While the received video stream is still provided at the first, or standard, aspect ratio, the video content aspect ratio can change, such as due to a commercial or change in programming. Accordingly, the received video stream can be re-analyzed to detect new aspect ratios.

Figure 3:
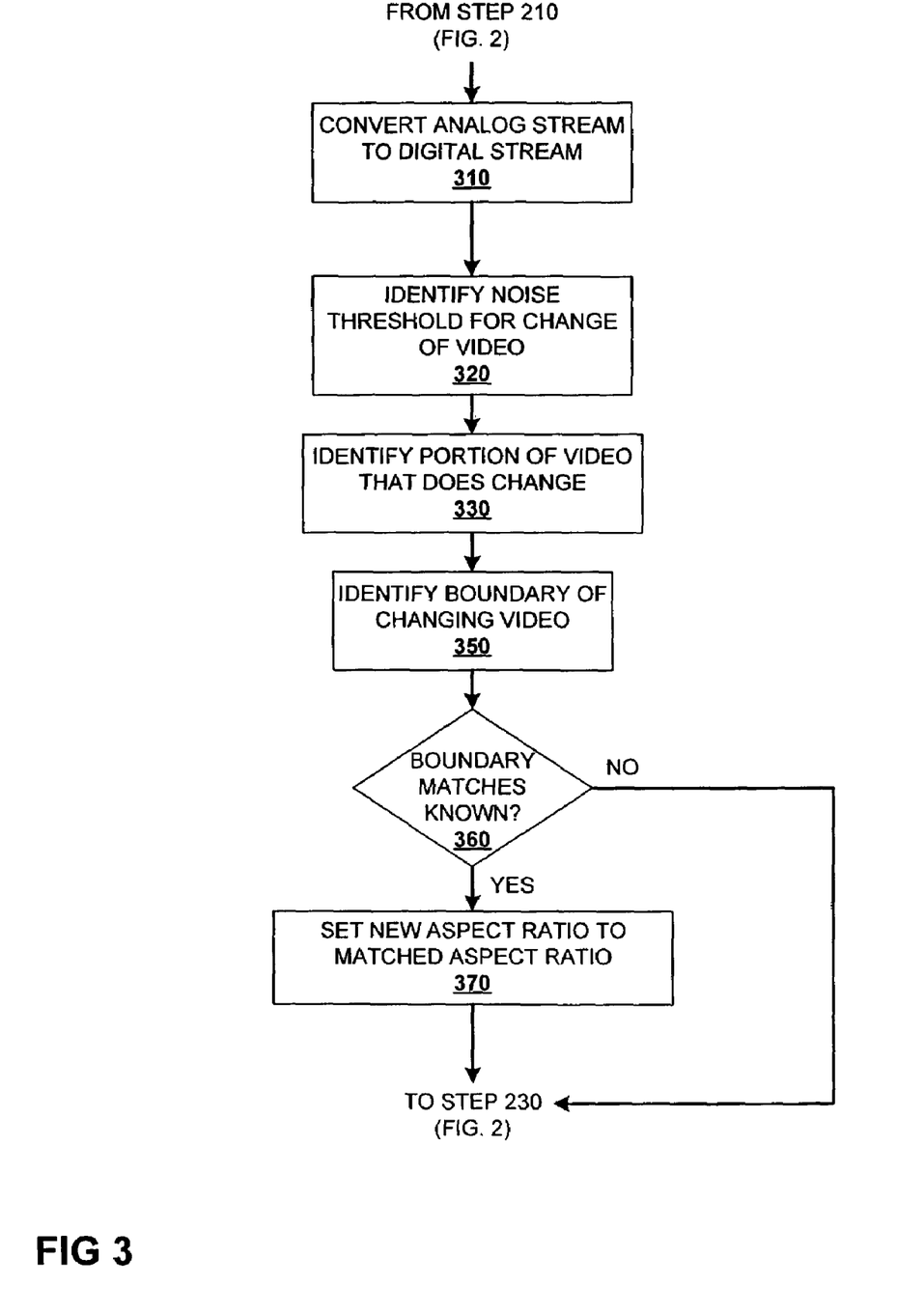
FIG. 3 is a flow diagram illustrating a method of identifying a viewable aspect ratio of a received video stream, according to one embodiment of the present disclosure.

Referring now to FIG. 3, a flow diagram illustrating a method of identifying a viewable aspect ratio of a received video stream is shown, according to one embodiment of the present disclosure. A video stream is analyzed to identify an aspect ratio of video content. In one embodiment, the video stream includes an analog video stream having a standard, or full-screen, aspect ratio, such as for display on a standard television screen. Motion or change of portions of the video stream between frames is used to identify video content within the video stream having a different aspect ratio, such as a widescreen aspect ratio. In one embodiment, the steps described in FIG. 3 represent step 220 (FIG. 2) in more detail.

In step 310, the analog video stream is converted into a digital stream. For example, the analog stream can be encoded to generate an MPEG video stream, such as through the use of a video demodulator and/or analog video capture hardware. In step 320, a noise threshold for detecting changes in video is identified. As video content is to be monitored based on movement, noise in the video stream can be misinterpreted as video content objects. Accordingly, a noise threshold can be used to account for noise in the video stream. The noise threshold can set a minimum object size to be used to determine movement within the video stream. Other ways of accounting for noise in the video stream can be used without departing from the scope of the present disclosure.

In step 330, the portion of the video stream that is changing, or moving, is identified. In one embodiment, frames of the video stream to be displayed are buffered and analyzed to identify portions of video that change over time. For example, motion vectors associated with blocks of video can be analyzed to identify portions of video change. The size of the blocks being used to determine changes in video can be based on the noise threshold. For example, based on a higher amount of expected noise, larger blocks of video may be necessary for movement or change to be registered. In step 350, the boundary of the changing video content is determined. While multiple, separate blocks can be identified as video content, a single boundary can be identified from a collection of the separate blocks. It should be noted that while identifying moving portions of the video stream is discussed, non-moving portions of the video stream can also be identified to determine the video content aspect ratio.

In step 360, the aspect ratio of the boundary identified in step 350 is compared to a set of known aspect ratios. For example, the boundary can be matched to 4:3, 5:4, 1.85:1, 2.35:1 or 16:9 aspect ratios. If no match is identified in step 360, the original aspect ratio is kept and the search for an aspect ratio is ended. It can be determined that if no known aspect ratio is found, the suspected non-moving portions are real video and the aspect ratio of the video content is the received aspect ratio. Alternatively, if a match is found in step 360, the system continues to step 370. In step 370, the new aspect ratio is set to the matched aspect ratio. In one embodiment, the system continues to step 230 (FIG. 2). It should be appreciated that other steps can be used in addition to or in place of the steps shown in the flow diagram of FIG. 3. For example, step 360 can be omitted. While matching the detected aspect ratio to a known aspect ratio allows for assurance that the detected aspect ratio is common, matching to known aspect ratios limits flexibility. Accordingly, step 360 can be omitted to allow for other aspect ratios.

Figure 4:
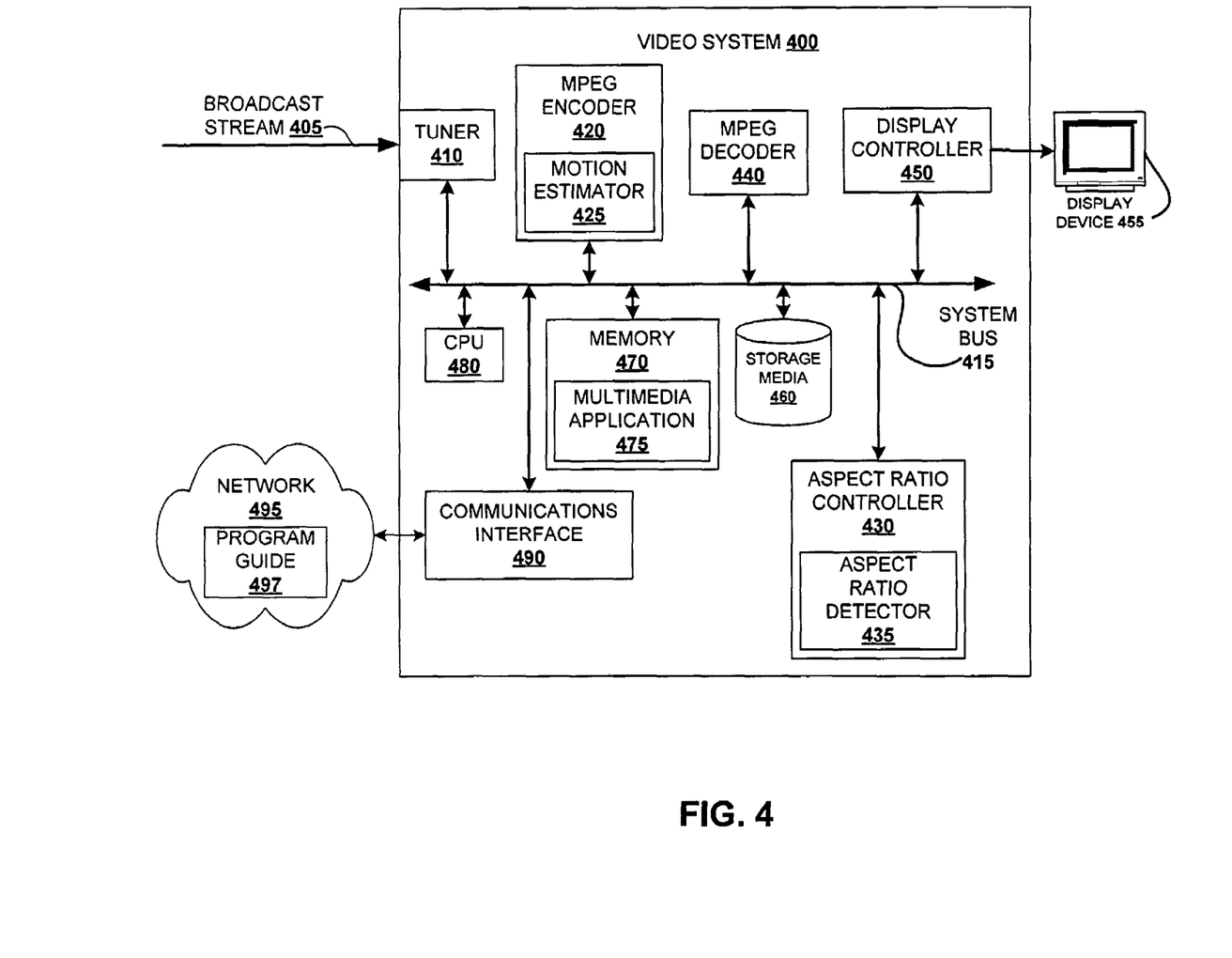
FIG. 4 is a block diagram illustrating a system for receiving analog video having a first aspect ratio and generating digital video related to a second aspect ratio, according to one embodiment of the present disclosure.

Referring now to FIG. 4, a block diagram illustrating a system for receiving analog video having a first aspect ratio and presenting digital video related to a second aspect ratio is shown and referenced generally as video system 400, according to one embodiment of the present disclosure. Video system 400 includes a tuner 410, an MPEG encoder 420, an MPEG decoder 440, an aspect ratio controller 430, a storage media 460, memory 470, a communications interface 490 and a central processing unit (CPU) 480 coupled together on a system bus 415. Video system 400 includes a multimedia application 475 to process video, such as video from broadcast stream 405, for storage in storage media 460 or display on display device 455. While video sent through broadcast stream 405 is sent at a standard aspect ratio, aspect ratio controller 430 identifies a video content aspect ratio associated with widescreen video within the broadcast stream 405. The aspect ratio controller 430 applies the video content aspect ratio to the multimedia application 475 to control storage, playback or display of the video from the broadcast stream 405. Memory 470 includes a memory device, such as a random access memory (RAM) integrated chip, used to store memory for processes or applications (such as multimedia application 475) run using a data processor, such as CPU 480. Storage media 460 includes a device or media, such as a hard drive or floppy disk, to store data and applications to be run.

Tuner 410 is used to process broadcast stream 405. Tuner 410 selects a particular carrier, or channel, of the broadcast stream 405. Generally, the channel is selected by a user through an application, such as multimedia application 475. In one embodiment, tuner 410 further includes a demodulator to process audio and video data associated with the signal of the selected channel. A video capture device (not shown) can be used to generate digital video frames associated with the audio and video data processed. In the illustrated embodiment, tuner 410 represents an analog television tuner. Other devices can also be used without departing from the scope of the present disclosure. In one embodiment, a demodulator is used to process video and audio signals from an external multimedia device, such as a VCR, a digital video disk (DVD) player, a satellite television tuner, and the like.

MPEG encoder 420 is used to process and format audio and video data, such as from tuner 410, into digital video stream data, such as MPEG related video data. In one embodiment, the MPEG encoder 420 generates frames of video data according to an MPEG protocol. Frames of digital video, such as video data associated with tuner 410, are divided into arrays of macroblocks (sets of 16×16 pixels). Luminance and chrominance data in the macroblocks are compressed using discrete cosine transform (DCT) and motion compensation. Motion estimator 425 uses motion prediction to estimate the movement of macroblocks between sequential frames. Accordingly, frames of MPEG video can be sent as: intra coded frames (I-frames), in which only DCT encoding is used; predicted frames (P-frames), in which DCT encoding and motion prediction based on previous frames are used; and bi-directional frames (B-frames), in which DCT encoding and motion prediction based on a previous or next frame are used. When motion prediction is used, the motion estimator 425 generates motion vectors to indicate where a block in a previous frame has moved to in a current, predicted frame. Once encoded, the frames of MPEG video data can be stored, such as in storage media 460, provided to an MPEG decoder 440 for playback, or provided to network 495, through communications interface 490. Control of MPEG encoder 420 can be based on multimedia application 475. It should be noted that MPEG encoder 420 is shown and discussed to illustrate an example of video processing performed with one embodiment of the present disclosure and other forms of video processing can be performed without departing from the scope of the present disclosure.

MPEG decoder 440 is used to process MPEG video frames. MPEG decoder 440 can process the MPEG video frames to generate uncompressed digital video frames. The uncompressed video frames can be provided to display controller 450 for presentation on display device 455. While MPEG encoder 420 and MPEG decoder 440 are shown as separate components, it should be appreciated that MPEG encoder 420 and MPEG decoder 440 can be part of a single component. Furthermore, in one embodiment, MPEG encoder 420 and MPEG decoder 440 are part of software processed using CPU 480, such as multimedia application 475. Alternatively, MPEG encoder 420 and MPEG decoder 440 can be part of hardware component(s), such as display controller 450. Display controller 450 includes hardware to process video and graphics received through system bus 415. Display controller 450 generates signals to drive display device 455 to display the video and graphics. Graphics can include display images related to operating system components, such as windows and text.

In one embodiment, multimedia application 475 is used to manage video for a user. The multimedia application 475 can be used to display video, such as video received through tuner 410, MPEG decoder 440, storage media 460 or communications interface 490. Alternatively, multimedia application 475 can be used to store video for playback at a future time. Multimedia application 475 can be used to control devices, such as tuner 410, MPEG encoder 420 or MPEG decoder 440 to identify video data to be processed. Multimedia application 475 can be used to control an aspect ratio or window size used to display video data. For example, multimedia application 475 can display video received through tuner 410 in a window having an arbitrary aspect ratio. Similarly, multimedia application 475 can be used to control a portion of video to be stored. As previously, discussed, video received through tuner 410 can be provided at a standard, full-screen aspect ratio, while the video includes video content at a different aspect ratio, as in the case of letterboxed video. In letterboxed video, black bars are used to provide video content having a non-standard widescreen aspect ratio, such as 16:9, at the full-screen aspect ratio, such as 4:3. However, the black bars require extra processing within MPEG encoder 420 and MPEG decoder 440, extra space in storage media 460, and use more of the desktop display space on display device 455.

Aspect ratio controller 430 can be used to identify the non-standard aspect ratio of the video content and remove extraneous video portions, such as black bars, received through letterboxed video associated with tuner 410. In one embodiment, the aspect ratio controller 430 includes an aspect ratio detector 435 to identify the aspect ratio of the video content in the letterboxed video. In one embodiment, the aspect ratio detector 435 compares portions of the video that change to determine if video content within the video received has a different aspect ratio than the standard aspect ratio. In one embodiment, the aspect ratio detector 435 monitors the motion vectors identified through motion estimator 425 to identify portions of the video that are changing. A total boundary of changing video portions can be determined by identifying an outline including all macroblocks that have motion, or changing information. The detected aspect ratio can be based on the identified boundary. While identifying changing video is discussed, video that is not changing can also be identified to determine the boundary of the video content. Alternatively, aspect ratio detector 435 can determine the video content aspect ratio by identifying portions of the video that are black, such as due to black bars. Once an aspect ratio has been detected, the aspect ratio detector 435 can compare the detected aspect ratio to a set of known aspect ratios. If the detected aspect ratio falls within an error margin of a known aspect ratio, the detected aspect ratio can be used.

In an alternate embodiment, the aspect ratio detector 435 can identify the aspect ratio of the video based on an electronic program guide, such as program guide 495. The program guide 487 can be accessed on a network 495, such as the Internet, through the communications interface 490. The program guide can provide information regarding a particular video being processed, such as video received through tuner 410. Once an aspect ratio has been detected for a video being processed, the aspect ratio controller 430 provides control information to apply the detected aspect ratio to the video. In one embodiment, the aspect ratio controller 430 provides the control information associated with the detected aspect ratio to the multimedia application 475. Accordingly, the multimedia application 475 can select a portion, related to the detected aspect ratio, of the video being processed, prior to storage or display. For example, multimedia application 475 can generate windows related to the detected aspect ratio for displaying only video content on display device 455. Extraneous video, outside of the detected aspect ratio, is discarded. In an alternate embodiment, the aspect ratio controller 430 can use the detected aspect ratio to program display controller 450 to only display the portion of the video associated with the detected aspect ratio, without modifying processing associated with multimedia application 475. While reference is made to detecting aspect ratios associated with broadcast stream 405, aspect ratios of video associated with other sources can also be used. In one embodiment, video received from network 495 is analyzed and processed to identify an aspect ratio to apply. Similarly, video stored in storage media 460 can also be analyzed and processed.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set top box, an internet capable device, such as a cellular phone, and the like. Alternatively, an information handling system may refer to a collection of such devices. It should be appreciated that the system described herein has the advantage of identifying a video content aspect ratio within video having a standard aspect ratio to remove extraneous video information.

In the preceding detailed description of the embodiments, reference has been made to the accompanying drawings which for a part thereof, and in which is shown by way of illustration specific embodiments in which the disclosure may be practiced. These embodiments are described in sufficient detail to enable those skilled in the art to practice the disclosure, and it is to be understood that other embodiments may be utilized and logical, mechanical and electrical changes may be made without departing from the spirit or scope of the present disclosure. To avoid detail not necessary to enable those skilled in the art to practice the disclosure, the description may omit certain information known to those skilled in the art. Furthermore, many other varied embodiments that incorporate the teaching of the disclosure may be easily constructed by those skilled in the art. According, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method comprising:
   receiving a first video stream, wherein the first video stream is provided at a first aspect ratio;
   determining a motion estimate associated with the first video stream;
   determining a second aspect ratio, different from the first aspect ratio, based on the motion estimate, wherein the second aspect ratio is associated with video content of the first video stream; and
   providing a second video stream, based on the first video stream, wherein the second video stream is provided at the second aspect ratio.

2. The method as in claim 1, wherein the motion estimate is determined as part of a video encoding process.

3. The method as in claim 1, wherein determining the motion estimate comprises:
   identifying non-moving boundaries within the first video stream.

4. The method as in claim 3, wherein determining the motion estimate further comprises applying a noise threshold to the first video stream.

5. The method as in claim 1, wherein determining the second aspect ratio includes:
identifying a portion of the first video stream not having black bars;
matching a size of a known aspect ratio to a size of first video stream not having black bars; and
setting the second aspect ratio to the known aspect ratio.

6. The method as in claim 1, wherein determining the second aspect ratio includes:
identifying program content associated with the first video stream;
identifying a video content aspect ratio based on the program content, and
applying the video content aspect ratio to the second aspect ratio.

7. The method as in claim 6, wherein the program content is identified through an electronic program guide.

8. The method as in claim 7, wherein the electronic program guide is accessed from a network.

9. The method as in claim 7, wherein the electronic program guide is provided with the first video stream.

10. The method as in claim 1, wherein the first video stream includes an analog video stream.

11. The method as in claim 10, further including converting the analog video stream into a digital video stream after receiving the first video stream and before determining the second aspect ratio.

12. A method comprising:
receiving a first portion of a first video stream having a first aspect ratio;
identifying a noise threshold;
identifying a boundary of the first portion of the first video stream, wherein the boundary is associated with a part of the first portion of the first video stream that does not change with time; and
generating a second video stream based on the first portion of the first video stream, wherein the second video stream has a second aspect ratio based on the boundary.

13. The method as in claim 12, wherein the video stream includes an analog video stream.

14. The method as in claim 13, further including converting the analog video stream into a digital video stream before identifying the boundary.

15. The method as in claim 12, wherein the boundary is identified based on the noise threshold.

16. The method as in claim 15, wherein identifying the boundary includes ignoring an amount of movement associated with noise based on the noise threshold.

17. A system comprising:
a video input to receive a first video stream having a first aspect ratio;
an aspect ratio detector to:
identify a second aspect ratio associated with the first video stream, wherein the second aspect ratio is different from the first aspect ratio; and
a digital video encoder to generate a second video stream based on the first video stream, the second video stream having the second aspect ratio, and wherein the digital video encoder includes a motion estimator.

18. The system as in claim 17, wherein the aspect ratio detector monitors the motion estimator to identify a portion of the video stream that is changing.

19. The system as in claim 17, further comprising a memory, and wherein said second video stream is stored in said memory.

20. The system as in claim 17, wherein said second video stream is provided to a display device.

21. A method comprising:
receiving a first video stream having a first aspect ratio;
identifying a first flame portion of the first video stream comprising moving content and a second frame portion of the first video stream comprising non-moving content based on motion estimation of the first video stream; and
providing a second video stream based on a video content of the first frame portion of the first video stream, the second video stream having a second aspect ratio based on the first frame portion.

22. The method as in claim 21, wherein identifying the first frame portion and the second frame portion comprises:
estimating motion of the first video stream; and
applying a noise threshold to the estimated motion to identify the moving content and the non-moving content.

23. The method as in claim 22, wherein estimating motion is performed as part of a video encoding process.

24. The method as in claim 21, wherein the first video stream represents letterboxed video content and wherein the second frame portion comprises at least one black bar of the letterboxed video content.

25. The method as in claim 24, wherein the second video stream represents widescreen video content.

26. The method as in claim 24, wherein providing the second video stream comprises:
matching a size of a known aspect ratio to a size of the first frame portion; and
setting the second aspect ratio to the known aspect ratio.

27. The method as in claim 21, wherein providing the second video stream comprises presenting the second video stream in a video window of a display.

28. A method comprising:
receiving a first video stream, wherein the first video stream is provided at a first aspect ratio;
determining a second aspect ratio, different from the first aspect ratio, wherein the second aspect ratio is associated with video content of the first video stream;
providing a second video stream, based on the first video stream, wherein the second video stream is provided at the second aspect ratio;
receiving a third video stream after providing the second video stream, wherein the third video stream is provided at the first aspect ratio;
determining a third aspect ratio associated with the third video stream; and
providing a fourth video stream, based on the third video stream, wherein the fourth video stream is provided at the third aspect ratio.

29. The method as in claim 28, wherein the third aspect ratio is the same as the first aspect ratio.

* * * * *